United States Patent [19]

Andrews et al.

[11] 3,720,222
[45] March 13, 1973

[54] FLUID PRESSURE REGULATING AND CONTROL DEVICE

[75] Inventors: Harry N. Andrews, Export; Erling Frisch; Norman R. Singleton, both of Pittsburgh; Phillip C. Stein, Lansdowne, all of Pa.

[73] Assignee: Westinghouse Electric Corporation, Pittsburgh, Pa.

[22] Filed: Oct. 27, 1971

[21] Appl. No.: 193,114

[52] U.S. Cl. .................................137/154, 137/494
[51] Int. Cl. ..............................................F16k 33/36
[58] Field of Search....137/183, 200, 494, 484, 484.2

[56] References Cited

UNITED STATES PATENTS 2,988,101  6/1961  Mueller..............................137/183
3,347,552  10/1967  Frisch...................................277/27

Primary Examiner—Alan Cohan
Attorney—A. T. Stratton et al.

[57] ABSTRACT

A controlled leakage device is provided which can control the flow of fluid out of a chamber over a wide range of fluid conditions, i.e., from subcooled liquid to superheated vapors. A hydrostatic balancing system is utilized to cause the seating force on a pressure barrier member to be related to the lifting force on the barrier member. Thus, the device can be constructed to remain in balance over the large change in lifting force that results when the fluid changes phase. Possible applications for the device include safety and relief valves for pressurizers, steam generators and boilers, and shaft seals.

20 Claims, 7 Drawing Figures

3,720,222

FLUID PRESSURE REGULATING AND CONTROL DEVICE

BACKGROUND OF THE INVENTION

This invention relates, generally to fluid pressure regulating and control devices and, more particularly to high pressure fluid control devices of the controlled leakage-type.

Heretofore, the control of system pressure increases in power generating plants has been accomplished by utilizing sprays, relief valves and safety valves. The sprays are constructed to control pressure changes due to small load changes; the relief and safety valves to control pressure during accident conditions. Prior relief and safety valves have been less reliable in service than desirable due to problems such as simmering and the resulting wire drawing (channeled erosion), due to steam leakage. The pressure bands required to alleviate simmering problems contribute to the necessity of setting the operating pressure of a pressurized vessel, such as a nuclear reactor, at a value that is significantly lower than the design pressure of the vessel. The following table shows the various pressure levels required with prior control devices and those made possible with the device herein disclosed:

TABLE 1

| | PRIOR | | | SAR |
|---|---|---|---|---|
| 2575 | All Safety valves open | | 2575 | Valve fully open |
| 2550 | | | 2550 | Safety Valve Action |
| 2525 | | | 2525 | |
| 2500 | 1st Safety valve opens | Design Pressure | 2500 | Reactor Trip Relief Action |
| 2475 | | | 2475 | |
| 2450 | | | 2450 | Valve starts to open |
| 2425 | | | 2425 | Nominal Operating Pressure |
| 2400 | Reactor Trip | | 2400 | |
| 2375 | | | 2375 | |
| 2350 | Relief valves open | | 2350 | |
| 2325 | Sprays fully on | | 2325 | |
| 2300 | | | 2300 | |
| 2275 | Sprays on | | 2275 | |
| 2250 | Nominal Operating Pressure | | 2250 | |

As shown by Table 1, the device herein disclosed can be constructed to perform the functions of both the relief and safety valves over a smaller pressure band than is required with prior devices, thereby permitting increasing reactor operating pressure with no increase in design pressure. In a typical reactor the nominal operating pressure can be raised from 2250 psi to 2425 psi. Thus, the reactor can operate at a higher temperature which greatly improves its efficiency.

In order to make the above improvements possible, it was necessary to provide a fluid pressure regulating and control device having confronting faces that can adequately restrict fluid flow with water or steam in the interface passage between the confronting faces of the device.

SUMMARY OF THE INVENTION

In accordance with the present invention, a controlled leakage face-type device is provided to control the flow of a fluid from a high pressure region to a low pressure region. An annular barrier member or ring is movably mounted in a housing having a face therein confronting a face on the ring. A hydrostatic balancing system is utilized to control the leak rate through the interface passage between the confronting faces under various operating conditions. This permits a small stable leakage to be maintained in the "closed" position so that the use of injection water and/or cold loop concepts are feasible to control the temperature and particulate content of the effluent. The hydrostatic balancing system includes a variable seating force whose magnitude depends on the fluid conditions between the faces. Thus, the device is constructed to remain in balance over the large change in lifting forces that results when the fluid changes phase.

BRIEF DESCRIPTION OF THE DRAWINGS

For a better understanding of the nature of the invention, reference may be had to the following detailed description, taken in conjunction with the accompanying drawings, in which.

DESCRIPTION OF THE PREFERRED EMBODIMENT

Figure 1:
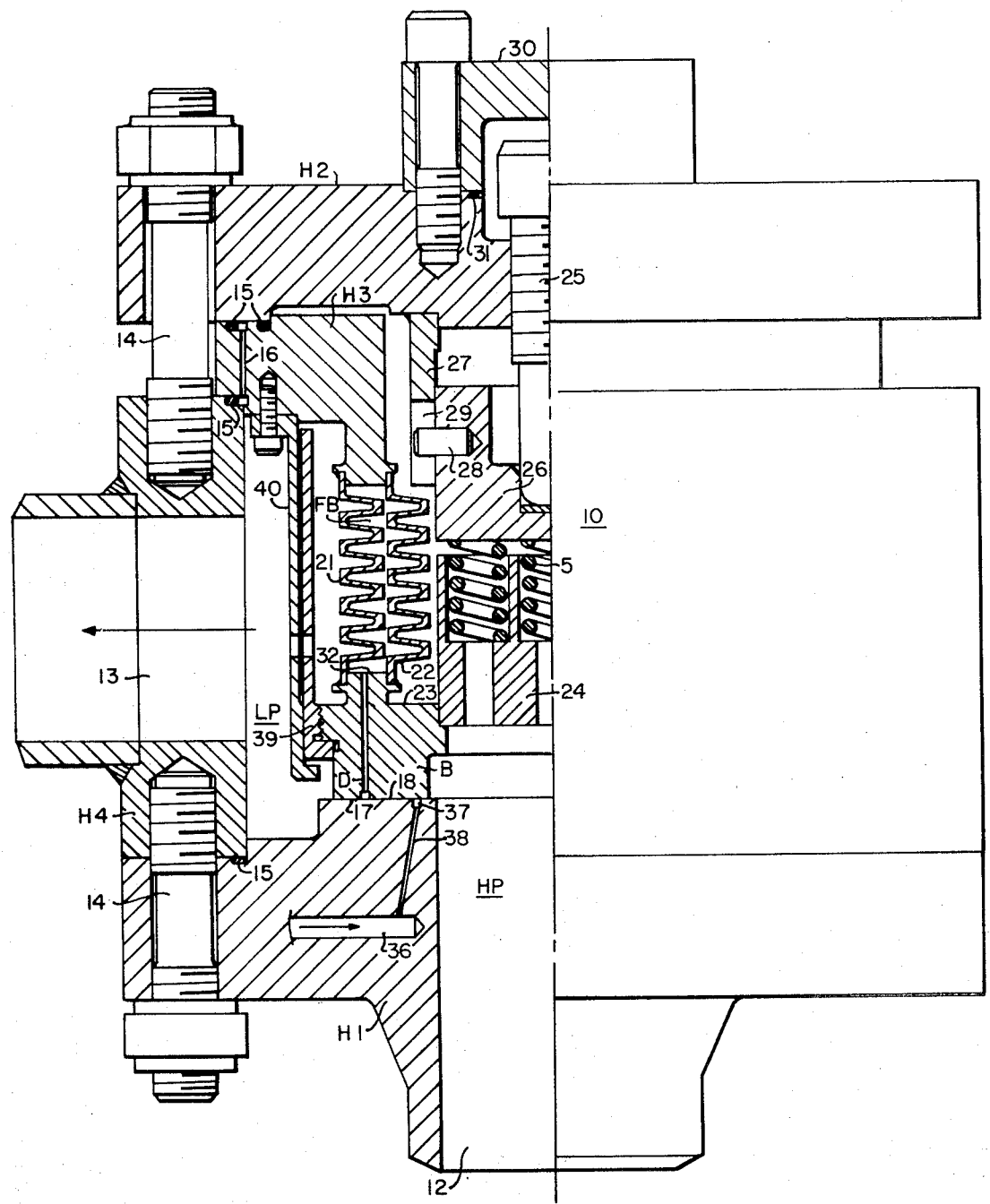
FIG. 1 is a view, partly in section and partly in elevation, of a fluid pressure regulating and control device embodying principal features of the invention.

As used herein, the term "fluid" includes a liquid, a vapor, or a gas. In FIG. 1 of the drawings there is shown a fluid pressure regulating and control device or valve 10 which is suitable for use with a vessel, such as a boiler, or a steam generator, or a pressurizer for a pressurized liquid cooled nuclear reactor, containing a two-phase fluid, such as water, under pressure. As explained more fully hereinafter, the device 10 may be utilized as a combination safety and relief valve for the vessel, thereby making it unnecessary to supply two separate valves as previously required.

The valve 10 comprises housing members H1, H2, H3 and H4 which define a high pressure fluid chamber HP and a low pressure fluid chamber LP. The housing member H1 has an inlet opening 12 therein through which high temperature, high pressure fluid enters the valve, and the housing member H4 has an outlet opening 13 therein from which low pressure fluid leaves the valve. The member H4 spaces the members H1 and H2 and is secured to them by means of stud bolts 14. The member H3 is clamped between the member H2 and H4 by the bolts 14. Metal O-ring seals 15 are provided in the joints between the housing members. A bleeder passageway 16 is provided in the member H3 to bleed off any fluid that might lead past the first O-ring seal between the members H2 and H3.

In order to permit a controlled amount of leakage fluid to flow from the high pressure chamber HP into the low pressure chamber LP, a hydrostatically balanced annular barrier member or valve ring B is movably mounted within the housing members. The housing member H1 has an annular face 17 thereon confronting the valve ring face 18. As shown more clearly in FIG. 2, an interface passage 19 extends between the confronting faces 17 and 18 for the flow of the leakage fluid. Spaced bellows 21 and 22 extend between the valve ring B and the housing member H3 to complete the barrier between the high pressure chamber HP and the low pressure chamber LP. The bellows are secured to the valve ring B and the housing member H3, as by welding, and permit vertical movement of the valve ring, under the influence of unbalanced forces.

As well known in the art, the leakage fluid flowing through the interface passage 19 exerts a lifting force on the valve ring B. This lifting force is partly balanced by providing a face 23 on the valve ring B, opposite the confronting face, which is exposed to the high pressure fluid in the chamber HP. A seating force is also provided by one or more relatively strong springs 5 mounted in a container 24 seated in the valve ring B. The force of the balancing springs 5, acting on the valve, is adjustable within certain limits by means of a set screw 25 bearing on a retainer 26 vertically movable in a sleeve 27 secured to the housing member H2, as by welding. Rotation of the retainer 26 is prevented by a pin 28 slidably disposed in a slot 29 in the sleeve 27. The set screw 25 is sealed from the atmosphere during normal operation by a bolted enclosure cap 30 with a metal O-ring seal 31.

In order to provide a variable seating force on the valve ring whose magnitude depends on the fluid conditions in the passage between the confronting faces, a feedback chamber FB is provided between the bellows 21 and 22 which function as seal means cooperating with the valve ring and the housing members to define the feedback chamber. A passageway D extends through the valve ring B to permit fluid to flow from the interface passage 19 into the feedback chamber FB. Additional passageways D may be provided if desired. A face 32 is provided on the valve ring B which is exposed to the pressure of the fluid in the feedback chamber FB. In this manner, the device is constructed to remain in balance over the large change in lifting forces that results when the fluid changes phase or state, as from water to steam.

Figure 2:
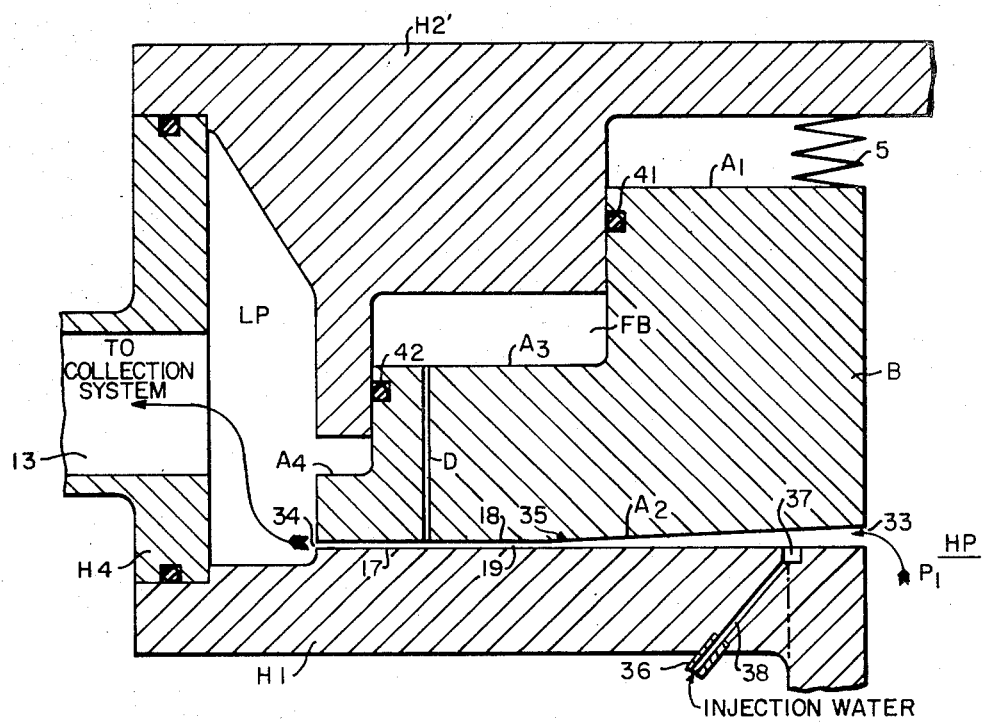
FIG. 2 is a diagrammatic view, in section, of the device shown in FIG. 1 with slight modifications.

As described in U.S. Pat. No. 3,347,552, issued Oct. 17, 1967 to Erling Frisch and assigned to Westinghouse Electric Corporation, in order to obtain a self-restoration of the relative position of the valve ring B and the housing member H1 upon a variation in the valve gap caused by vibration, a fluid flow path of decreasing thickness is provided from the high pressure edge or extremity 33 (FIG. 2) to a position between the valve face extremities 33 and 34. More specifically, as shown in FIG. 2, the fluid flow path of decreasing thickness extends between the edge 33 and an intermediate concentric circle located at 35. The decreasing flow path thickness may be formed by tapering the confronting surface 18 of the valve ring slightly away from the confronting surface 17 of the housing member H1 between the circle 35 and the edge 33 of the valve ring B. The angle of the taper shown on the drawing is exaggerated.

As explained hereinbefore, the seating force on the valve ring is augmented by a force which is proportional to the interface pressure at a selected point of the flow path. As shown, the entrance to the passageway D is so located between the concentric circle 35 and the low pressure edge 34 of the valve ring as to obtain the desired operating characteristics of the valve.

The use of hydrostatic balancing to control the leak rate under the various operating conditions permits a small stable leakage to be maintained in the "closed" position of the valve. Thus, injection water and/or a cold loop concept may be utilized to control the temperature and the particulate content of the effluent. As shown in FIGS. 1 and 2, a passageway 36 is provided in the housing member H1 to inject water into the interface passage 19 at a pressure slightly higher than the normal operating pressure in the high pressure chamber HP. A distribution cavity 37 is provided for the injection water which exits out of the valve and into the circulatory system in which the valve is connected. The injection water may be supplied from a suitable source (not shown). An orifice 38 is provided in the injection water line to limit the flow rate of the injection water. The distribution cavity 37 for the injection water is located between the entrance to the passageway D into the feedback chamber and the high pressure extremity of the interface passage, preferably relatively close to the high pressure extremity. Thus, most of the injection water flows through the interface passage into the low pressure chamber.

A bushing 39, which is attached to the valve ring B by threading, serves as a stop to limit upward movement of the valve ring, thereby limiting the maximum valve opening. Another bushing 40, which is bolted to the housing member H3, overlaps the bushing 39 and serves as a guide for the valve ring to keep it centered and to prevent radial motion of the valve ring when it is lifted from its seat.

Figure 3:
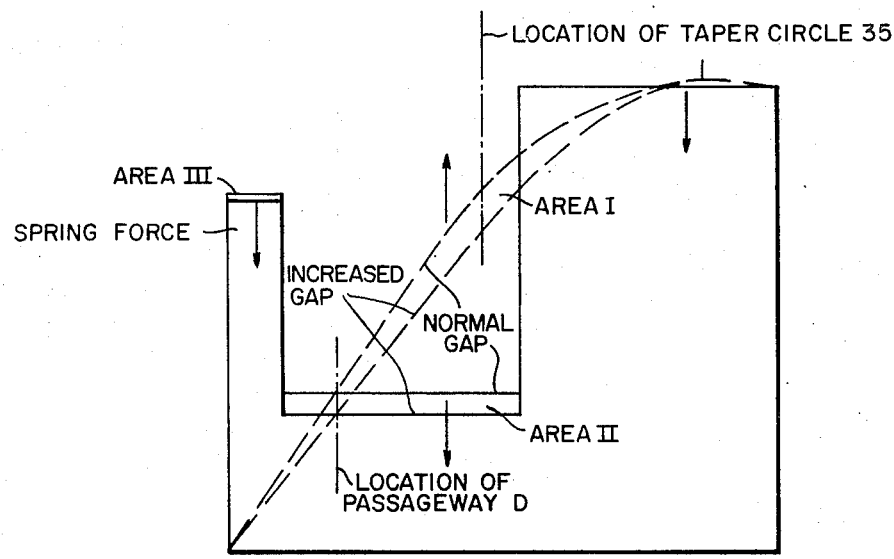
FIGS. 3, 4 and 5 are force diagrams graphically illustrating the forces acting on the device during its operation under different conditions.

The operation of the valve may be better understood by referring to FIGS. 2 and 3. In the structure shown diagrammatically in FIG. 2, O-ring seals 41 and 42 are substituted for the bellows 21 and 22. Also, housing members H1 and H3 are combined into one member H2'. The O-ring seals 41 and 42 cooperate with the valve ring B and the housing member H2' to define the feedback chamber FB.

NORMAL OPERATION

In normal operation, (i.e., the "closed" position) cool injection water at a pressure slightly higher than P1 is injected into valve interface from cavity 37, exiting into low pressure chamber LP. Since the pressure in cavity 37 is slightly higher than normal P1, a small amount flows into high pressure chamber HP. This injection water serves the following purposes:

1. Under normal conditions, it allows clean water to flow in the valve interface, minimizing crude problems.
2. It allows for the normal collection of clean, uncontaminated water.
3. If prevents steam from forming in the interface when the valve is operating normally.

The axial forces acting on the valve ring B in this equilibrium position are depicted in FIG. 3. The solid lines are seating forces, the dashed lines are lifting forces. FIG. 2, which is a sketch of the valve cross section, is shown above the force diagram to relate the pressure areas to their respective valve surfaces. The spring force (mechanical) is represented by an equivalent pressure area to facilitate demonstration of balanced forces.

When the areas under the dashed line and the solid lines are equal, the valve is in equilibrium at this separation. Furthermore, the equilibrium is stable since a deviation from this face separation results in a force unbalance that tends to restore the valve ring to the equilibrium position. For example, if the face separation is increased, the taper in the interface flow path causes a decrease in the concavity of the lifting pressure distribution. The resulting decrease in lifting force (Area I, FIG. 3) is greater than the decrease in seating force (Area II-Area III) so that a net seating force is developed. The net seating force is due primarily to the decreased pressure in the feedback chamber FB as the spring force is only slightly increased during this action because very small displacements of the valve ring B occur. Similar arguments apply when the face separation is decreased. Thus, a low, controllable leak rate is possible in this position.

HIGH PRESSURE OPERATION

Figure 4:
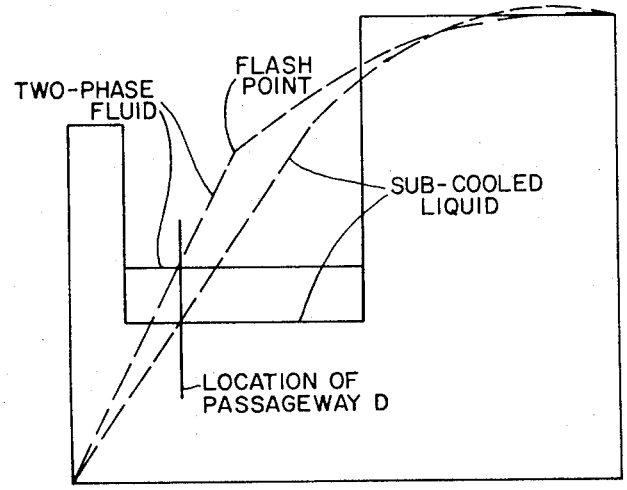

When the system pressure P1 attains a value greater than the injection pressure, system fluid begins to mix with injection water and flow out of the valve. This eventually causes the average fluid temperature at the outlet to be higher than the boiling point of the fluid. Depending on the temperature and pressure of the fluid entering the valve and the particular valve construction, equilibrium is achieved with flashing occurring at the outlet, at some position along the face, or (with steam as the sealed fluid) with steam over the entire interface. The pressure distribution that would occur with flashing in the interface is illustrated schematically in FIG. 4. The orifice provided in the injection water line limits the flow rate of injection water during this condition. The greatly increased lifting force, due to flashing, is offset by the increased seating force as a result of communication of the feedback chamber FB with the interface through passageway D, thereby exposing part of the top surface of the valve ring to the higher pressure in the interface passage and in the feedback chamber.

Figure 6:
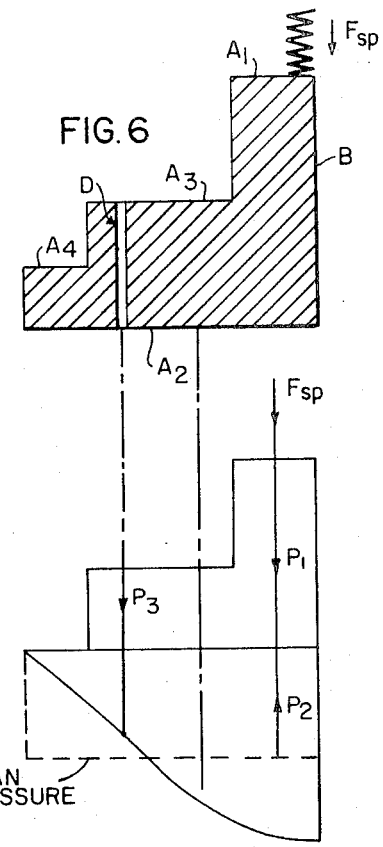
FIG. 6 is a hydraulic force diagram illustrating the forces acting on the device when it is under a balanced condition.

When operating in the high pressure condition, the face separation and, consequently, the bypass flow is a function of system pressure if this exceeds the injection pressure P. This is best understood by referring to the hydraulic force diagram, FIG. 6. The valve ring B is balanced by the spring force Fsp and the hydraulic pressure forces when:

$$Fsp + P_1A_1 + P_3A_3 = P_2A_2 \quad (1)$$

where $P_2$ is the mean pressure under the valve ring (Area $A_2$) and $P_1$ and $P_3$ are the pressures acting on areas $A_1$ and $A_3$, respectively, tending to seat the valve ring. Since the pressure on area $A_4$ is the low outlet pressure it has no effect on the balance of the valve ring.

Equation (1) may also be written:

$$F_{sp} = P_2A_2 - (P_1A_1 + P_3A_3) = LF - SF \quad (2)$$

where LF is the total hydraulic lifting force and SF is the total hydraulic seating force.

Assuming now that the system pressure is increased by a factor X, the values of $P_2$ and $P_3$ will also increase in approximately the same proportion and Equation (2) may be written:

$$XP_2A_2 - X(P_1A_1 + P_3A_3) = X(LF - SF) \quad (3)$$

This says that the difference between hydraulic lifting and seating forces is increased by the factor X, thereby upsetting the balance of the valve ring. As a result, the valve ring will be forced away from its seat and compress the spring until equilibrium again is attained when the spring force reaches a value of $XF_{sp}$. This may be expressed by:

$$XF_{sp} - F_{sp} = K\delta \quad \text{or} \quad (4)$$

$$\delta = [(X-1)/K] F_{sp} \quad (5)$$

where $\delta$ is the valve ring separation and K is the spring constant. This shows that the valve ring separation increases with the increase in inlet pressure and is a function of the spring constant.

Figure 7:
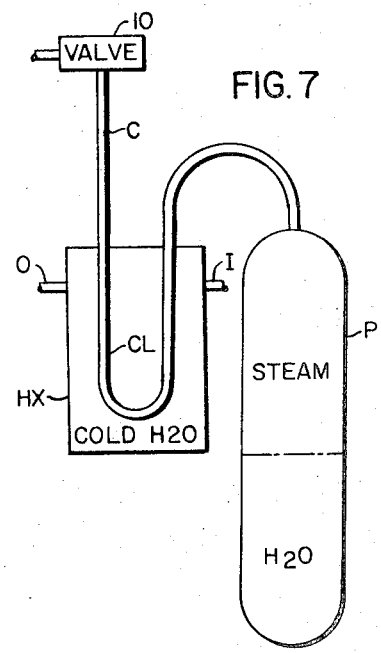
FIG. 7 is a diagrammatic view illustrating the use of the device in a power system which includes a pressurizer and a cold leg or loop heat exchanger.

A valve construction is also possible using a cold loop instead of injection water. As shown diagrammatically in FIG. 7, the valve 10 is connected to a pressure vessel P by means of a fluid conductor C having a cold loop CL disposed in a heat exchanger HX having an inlet I and an outlet O. Cold water is circulated through the heat exchanger from a suitable source (not shown). Thus, the fluid flowing through the loop CL is subjected to the cooling effect of the heat exchanger. The vessel P may be a pressurizer for a reactor power system or any vessel containing a two-phase fluid under pressure.

Figure 5:
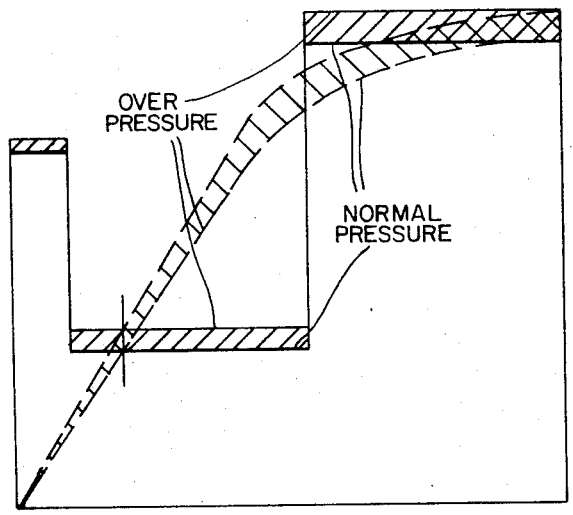

The pressure balance of a valve of this type is depicted in FIG. 5. The operation of the valve is similar to that described above except that the valve is sensitive to changing inlet pressures over the range of operation. If the system pressure increases above the normal value, the face separation and flow rate increase as explained hereinbefore. For small increases, the changes are shown by the cross-hatched areas in FIG. 5. Any increase in lifting force is balanced by an increase in seating force. As the pressure, and thus flow increase, the fluid temperature increases. Since the rate of heat removal of the cold loop is relatively constant, this finally results in boiling and a new equilibrium is established as discussed previously.

The device herein disclosed can also be used as a seal which can control leakage even if the fluid being handled increases significantly in temperature causing steam outflow. Thus, the device may be used to improve the seals utilized on main coolant pumps.

From the foregoing description, it is apparent that the invention provides a fluid pressure regulating and control device which has numerous advantages over prior devices. When applied to the problem of reactor pressure control, simmering and associated problems are eliminated because a continuous controlled leakage flow through the device is maintained.

As shown by Table 1, the device can be constructed to perform the functions of both the relief and safety valves over a smaller pressure ban than is required with prior valves, thereby permitting increasing reactor operating pressure with no increase in design pressure. Thus, the efficiency of a reactor can be improved to realize a saving in the cost of operating a power generating plant. The present device can be economically manufactured and installed.

We claim as our invention:

1. A fluid pressure regulating and control device, comprising housing members defining a high pressure fluid chamber and a low pressure fluid chamber, an annular barrier member movably mounted within the housing members to permit a controlled amount of leakage fluid to flow from the high pressure chamber into the low pressure chamber, an annular face in the housing, a face on the barrier member confronting the face in the housing with an interface passage therebetween for the flow of the leakage fluid, said leakage fluid exerting a lifting force on the barrier member, a face on the barrier member opposite the confronting face and exposed to the high pressure fluid to provide a seating force on the barrier member, seal means cooperating with the barrier member and the housing members to define a feedback pressure chamber, said barrier member having a passageway therethrough permitting fluid to flow from the interface passage into the feedback pressure chamber, and said barrier member having an additional face thereon exposed to the pressure of the fluid in the feedback chamber to provide a variable seating force on the barrier member having a magnitude depending on fluid conditions in the interface passage.

2. The device defined in claim 1, including spring means also providing a seating force on the barrier member.

3. The device defined in claim 1, including means for injecting a liquid into the interface passage at a pressure higher than the normal operating pressure in the high pressure chamber.

4. The device defined in claim 3, wherein the liquid is injected into the interface passage at a point between the high pressure extremity of the interface passage and the passageway which permits fluid to flow from the interface passage into the feedback pressure chamber.

5. The device defined in claim 1, wherein the confronting face on the barrier member is tapered to provide a fluid flow path of decreasing thickness from the high pressure edge of the barrier member to a concentric circle intermediate the high pressure edge of the barrier member and the low pressure edge of the barrier member.

6. The device defined in claim 5, wherein the entrance to the passageway permitting fluid to flow from the interface passage into the feedback pressure chamber is located between said concentric circle and the low pressure edge of the barrier member.

7. The device defined in claim 1, wherein the seal means comprises bellows extending between the barrier member and a housing member.

8. The device defined in claim 1, including a first bushing threadedly attached to the barrier member and cooperating with a housing member to limit the movement of the barrier member.

9. The device defined in claim 8, including a second bushing attached to the housing member and cooperating with the first bushing to guide the movement of the barrier member.

10. The device defined in claim 1, wherein one of the housing members has a high pressure inlet opening therein, another member has a low pressure exit opening therein and is secured to and spaces the other housing members.

11. A fluid pressure regulating and control valve for use with a vessel containing a two-phase fluid under pressure, said valve comprising housing members defining a high pressure fluid chamber and a low pressure fluid chamber, a hydrostatically balanced valve ring movably mounted within the housing members to permit a controlled amount of leakage fluid to flow from the high pressure chamber into the low pressure chamber, an annular face on one of the housing members, a face on the valve ring confronting the face on the housing member with an interface passage therebetween for the flow of the leakage fluid, said leakage fluid exerting a lifting force on the valve ring, a face on the valve ring opposite the confronting face and exposed to the high pressure fluid to provide a seating force on the valve ring, seal means cooperating with the valve ring and the housing members to define a feedback pressure chamber, said valve ring having a passageway therethrough permitting fluid to flow from the interface passage into the feedback pressure chamber, said valve ring having an additional face thereon exposed to the pressure of the fluid in the feedback chamber to provide a variable seating force on the valve ring having a magnitude depending on fluid conditions in the interface passage, a fluid conductor connecting the vessel to the valve, and heat exchanger means for cooling the fluid flowing through the conductor.

12. The subject matter defined in claim 11, wherein the conductor includes a loop subjected to the cooling effect of the heat exchanger means.

13. The subject matter defined in claim 11, including spring means also providing a seating force on the valve ring.

14. The subject matter defined in claim 11, wherein the confronting face on the valve ring is tapered to provide a fluid flow path of decreasing thickness from the high pressure edge of the valve ring to a concentric circle intermediate the high pressure edge of the valve ring and the low pressure edge of the valve ring.

15. The subject matter defined in claim 11, wherein the entrance to the passageway permitting fluid to flow from the interface passage into the feedback pressure chamber is located between said concentric circle and the low pressure edge of the valve ring.

16. A fluid pressure regulating and control valve, comprising housing members defining a high pressure fluid chamber and a low pressure fluid chamber, a valve ring movably mounted within the housing members to permit a controlled amount of leakage fluid to flow from the high pressure chamber into the low pressure chamber, an annular face on one of the housing members, a face on the valve ring confronting the face on the housing member with an interface passage therebetween for the flow of the leakage fluid, said leakage fluid exerting a lifting force on the valve ring, a face on the valve ring opposite the confronting face and exposed to the high pressure fluid to provide a seating force on the valve ring, seal means cooperating with the valve ring and the housing members to define a feedback pressure chamber, passageway means permitting fluid to flow from the interface passage into the feedback pressure chamber, and an additional face on the valve ring exposed to the pressure of the fluid in the feedback pressure chamber to provide a variable seating force on the valve ring having a magnitude depending on fluid conditions in the interface passage.

17. The valve defined in claim 16, including spring means also providing a seating force on the valve ring.

18. The valve defined in claim 16, wherein the entrance to the passageway means is located intermediate the extremities of the interface passage.

19. The valve defined in claim 18, wherein the passageway means extends through the valve ring.

20. The valve defined in claim 17, including means for adjusting the force of the spring means.

* * * * *